United States Patent [19]
Worrell et al.

[11] Patent Number: 6,092,832
[45] Date of Patent: Jul. 25, 2000

[54] AIR BAG MODULE MOUNTING MECHANISM AND METHOD OF MAKING

[75] Inventors: Barry Christian Worrell, Centerville; Kenneth C. Enneking, Dayton; Jerald Lee Spiller, Huber Heights; Robert J. Schubert, Cincinnati; Patrick W. Schatz, Lebanon, all of Ohio

[73] Assignee: General Motors Corporation, Detroit, Mich.

[21] Appl. No.: 09/034,639

[22] Filed: Mar. 4, 1998

[51] Int. Cl.$^7$ .................................................. B60R 21/16
[52] U.S. Cl. ........................................ 280/728.2; 280/731
[58] Field of Search ............................... 280/728.2, 731, 280/732

[56] References Cited

U.S. PATENT DOCUMENTS

| | | | |
|---|---|---|---|
| 5,380,037 | 1/1995 | Worrell et al. | 280/728.2 |
| 5,501,484 | 3/1996 | Saderholm et al. | 280/728.2 |
| 5,615,907 | 4/1997 | Stanger | 280/728.2 |
| 5,692,773 | 12/1997 | Ono | 280/728.2 |

*Primary Examiner*—Kenneth R. Rice
*Attorney, Agent, or Firm*—Kathryn A. Marra

[57] ABSTRACT

A mounting mechanism is provided for mounting an air bag module to a support plate of a vehicle. The mounting mechanism includes a single, generally flat blank of material formed to provide a generally flat base plate and a plurality of generally flat elongated mounting members which are each bent to extend downwardly from the base plate. The mounting members are adapted for attachment to the vehicle whereby the module is attached to the vehicle. Preferably, the mounting members are bent to extend generally at 90 degrees from the base plate. Advantageously, the mounting mechanism is easily made by providing a single flat blank of material and stamping the blank to form the planar outline of a base plate and elongated mounting members which are integrally formed as a single flat piece with the base plate and then by bending each of the mounting members at approximately 90 degrees relative to the base plate such that the mounting members extend downwardly from the base plate.

9 Claims, 5 Drawing Sheets

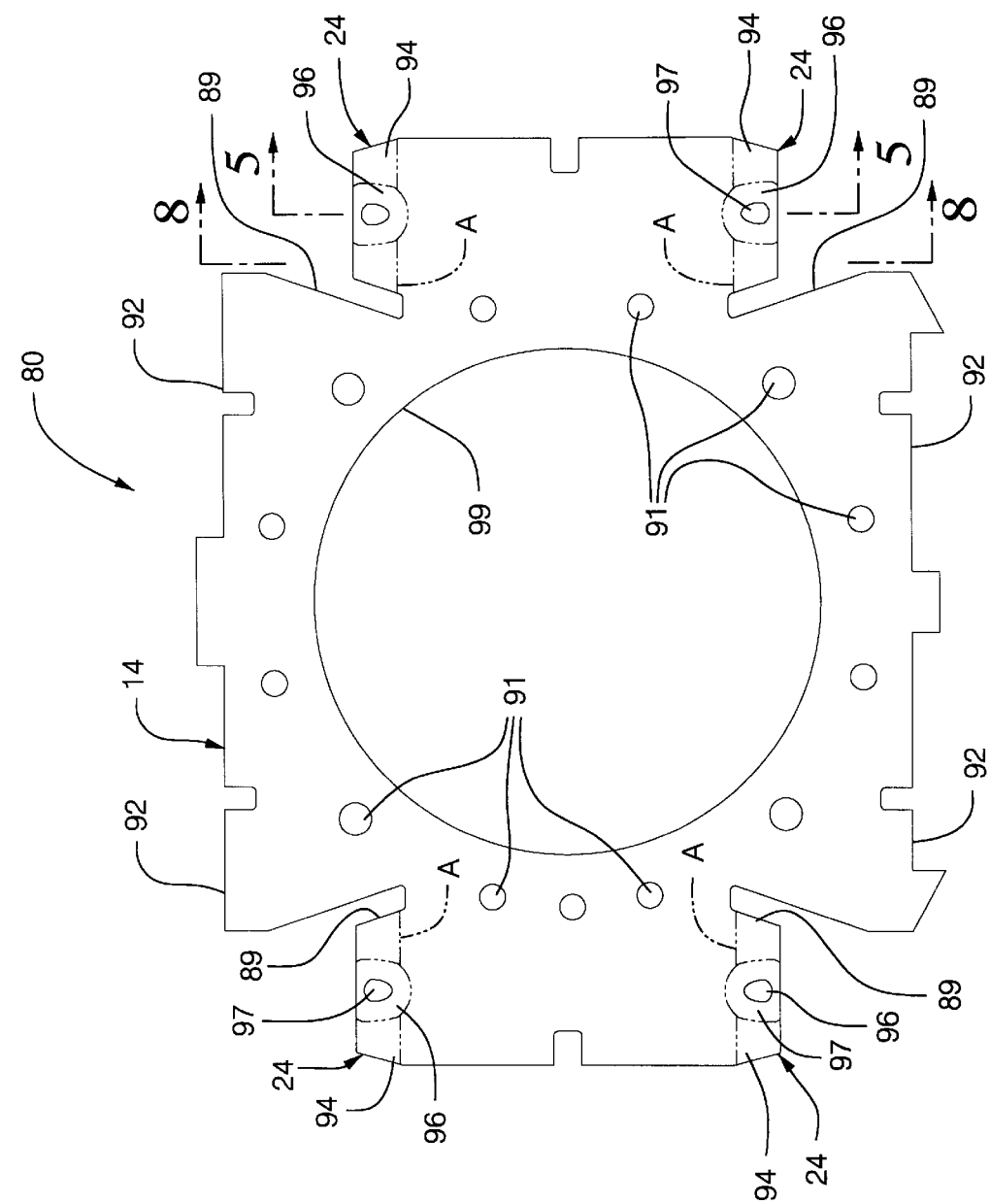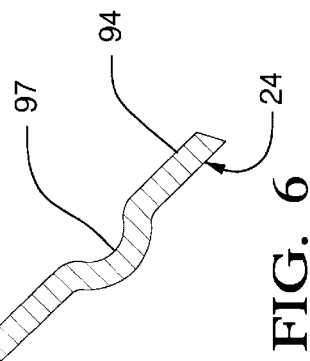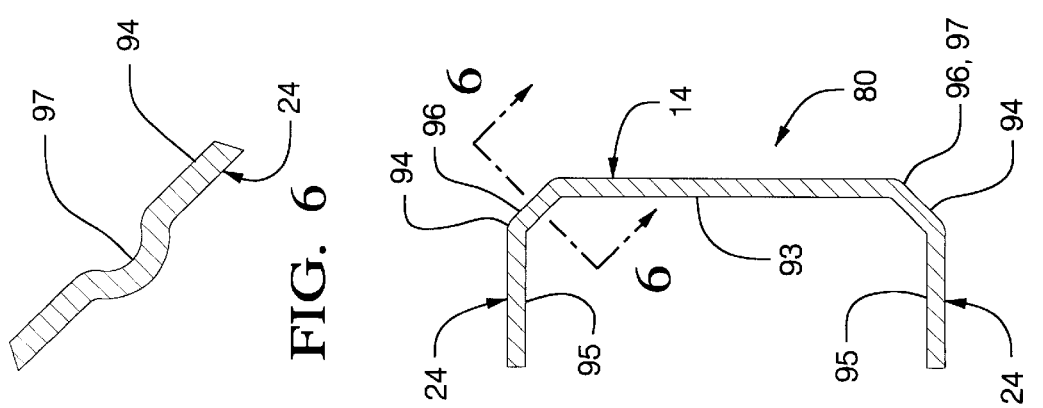

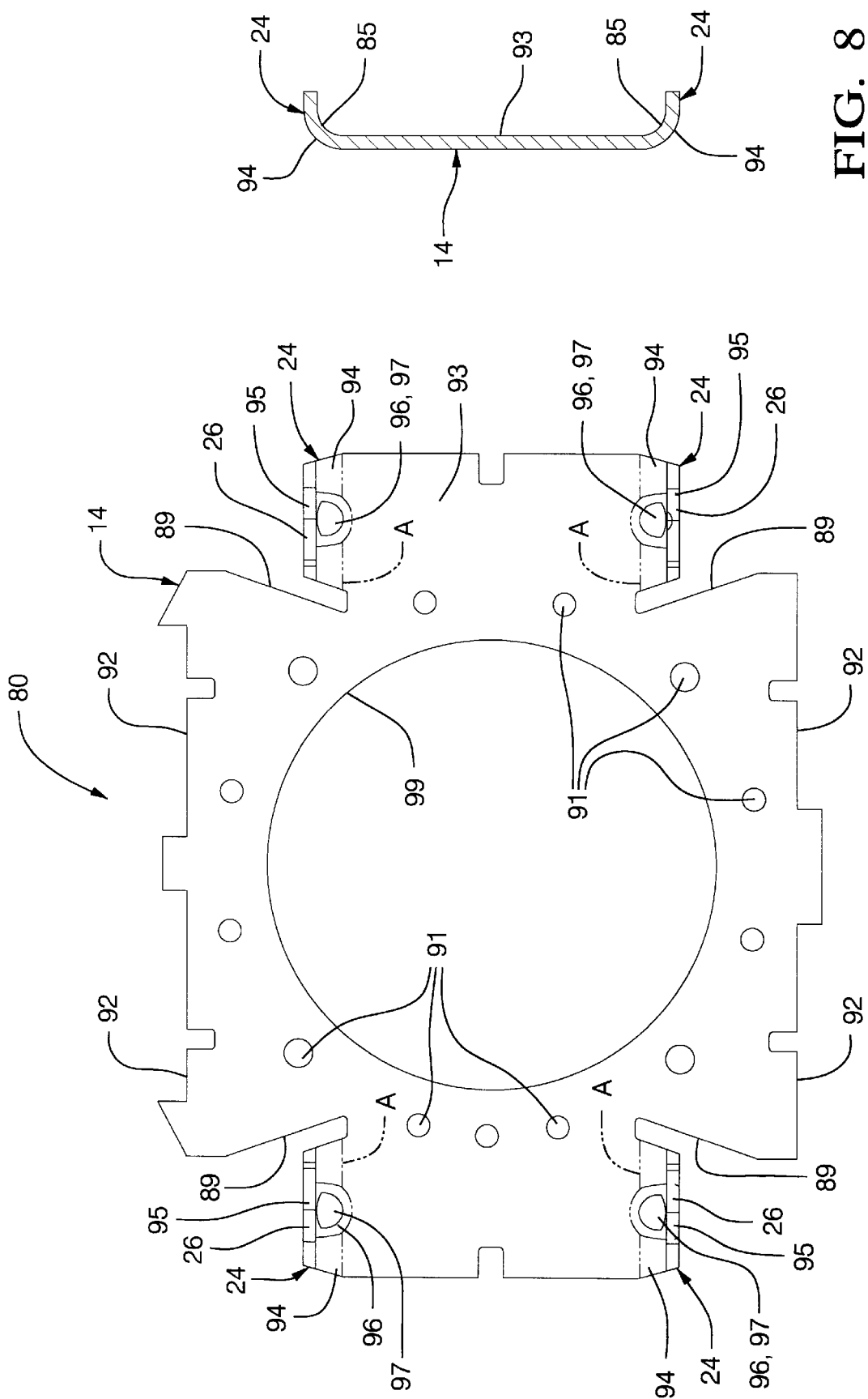

AIR BAG MODULE MOUNTING MECHANISM AND METHOD OF MAKING

This invention relates to an air bag module mounted to a vehicle, and more particularly to a retention mechanism for quickly and effectively mounting an inflatable restraint module to a supporting vehicle structure and a simplified method of making the retention mechanism.

BACKGROUND OF THE INVENTION

It is well known in motor vehicles to provide an air bag module mounted to a vehicle. For example, a typical driver's side air bag module includes a generally circular inflator positioned partially within a bag opening of an air bag for discharging inflator gas to inflate the air bag upon sensing certain predetermined vehicle conditions. The undeployed air bag is folded atop the inflator and a module cover overlies the air bag, inflator, and other module components. The cover commonly has tear lines or weakened portions that allow the cover to open during air bag inflation.

Various mechanisms have been used for securing the air bag module to a support structure in a vehicle, such as the steering wheel or dashboard. In one known mounting system, bolts are provided passing from the rear of the support structure and threadably engaging nuts mounted on the air bag module. It is further known to provide such a module mounting system for a vehicle steering wheel wherein sleeve members mounted to the air bag module and surrounding the mounting bolts may be forced into contact with a plate forming the supporting structure on the steering wheel hub to complete a circuit for actuating a horn.

It is also known to provide a support plate attached to the vehicle and having opposing front and rear faces and a plurality of apertures therethrough for receiving mounting members attached to the module. Each of the mounting members is individually cold-formed into a solid, cylindrical member having a head portion and an opposing distal end having a slot therein. Each of head portions of the mounting members, typically four, must be separately pressed or welded onto a metal base plate. The support plate has latching elements mounted thereon which snap-fittedly engage the slots of the mounting members as the distal ends are moved through the apertures in the support plate. While this snap-fitted arrangement offers significant ease of assembly over the prior art, it has the shortcoming of requiring a plurality of cylindrical mounting members that must each be individually formed and individually attached to the base plate. In addition, the mounting members are relatively heavy and forming the slots in the solid, cylindrical mounting members is difficult. Thus the slots are limited to a generally rectangular shaped slot with only straight edges retaining the latching elements.

SUMMARY OF THE INVENTION

The present invention offers alternatives and advantages over the prior art by providing an improved mechanism for retaining the module to the vehicle which simplifies manufacturing, reduces weight, and reduces the number of parts. Advantageously, the ease of manufacturing allows additional retention features to be easily provided.

These advantages are accomplished in the present invention by providing a mounting mechanism for mounting an air bag module to a support plate of a vehicle. The mounting mechanism includes a single, generally flat blank of material formed to provide a generally flat base plate and a plurality of generally flat elongated mounting members which are each bent to extend downwardly from the base plate. The mounting members are adapted for attachment to the vehicle whereby the module is attached to the vehicle. Preferably, the mounting members are bent to extend generally at 90 degrees from the base plate.

In accordance with other preferred aspects of the invention, the support plate carries spring elements and the mounting members each include a slot thereon for receiving the spring elements therein. The slots each include an underhook extending into the slot for retaining the spring elements securely in the slots. Preferably, the generally flat mounting members each include a head portion and a body portion. The body portions are connected to the base plates by the head portions and the head portions are wider than the body portions of the mounting members. The head portions each include a smooth radius of curvature about which the mounting members are bent relative to the base plate. The head portions each also preferably include a notched portion formed therein. The notched portions each include a rib extending laterally across each of the head portions for stiffening the mounting members.

Advantageously, the mounting mechanism is made by providing a single flat blank of material and stamping the blank to form the planar outline of a base plate and elongated mounting members which are integrally formed as a single flat piece with the base plate and then by bending each of the mounting members at approximately 90 degrees relative to the base plate such that the mounting members extend downwardly from the base plate. Additional features, such as slots including an underhook may also be stamped into the blank.

Thus, the present invention is characterized by providing simplicity in manufacturing, ease of assembly and disassembly, reduction of parts and assembly time for mounting the module to the vehicle.

BRIEF DESCRIPTION OF THE DRAWINGS

An embodiment of the present invention is described below, by way of example only, with reference to the accompanying drawings in which:

FIG. 4 is a top plan view of the mounting mechanism;

FIG. 5 is a sectional view taken along line 5—5 of FIG. 4;

FIG. 6 is a sectional view taken along line 6—6 of FIG. 5;

FIG. 7 is a bottom plan view of the mounting mechanism;

FIG. 8 is a sectional view taken along line 8—8 of FIG. 4;

DESCRIPTION OF THE PREFERRED EMBODIMENT

Figure 2:
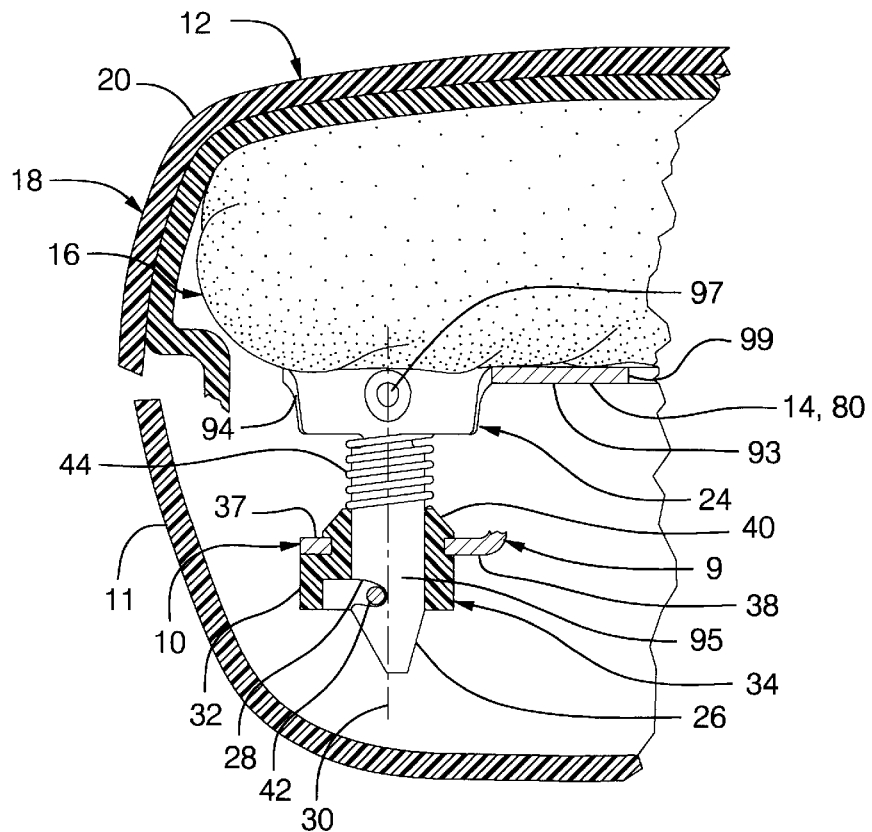
FIG. 2 is a side sectional view of an air bag module and showing the air bag module attached to a support plate of the vehicle.

Referring to FIG. 2, a vehicle 9 includes a support plate 10 which is shown as part of a lower central portion of a vehicle steering wheel surrounded by a lower shroud 11. Although not shown, it will be appreciated that the lower shroud 11, rim and spokes portions are mounted to the support plate 10 to form a central open hub portion wherein the support plate 10 is attached to a steering shaft of the vehicle 9.

Figure 1:
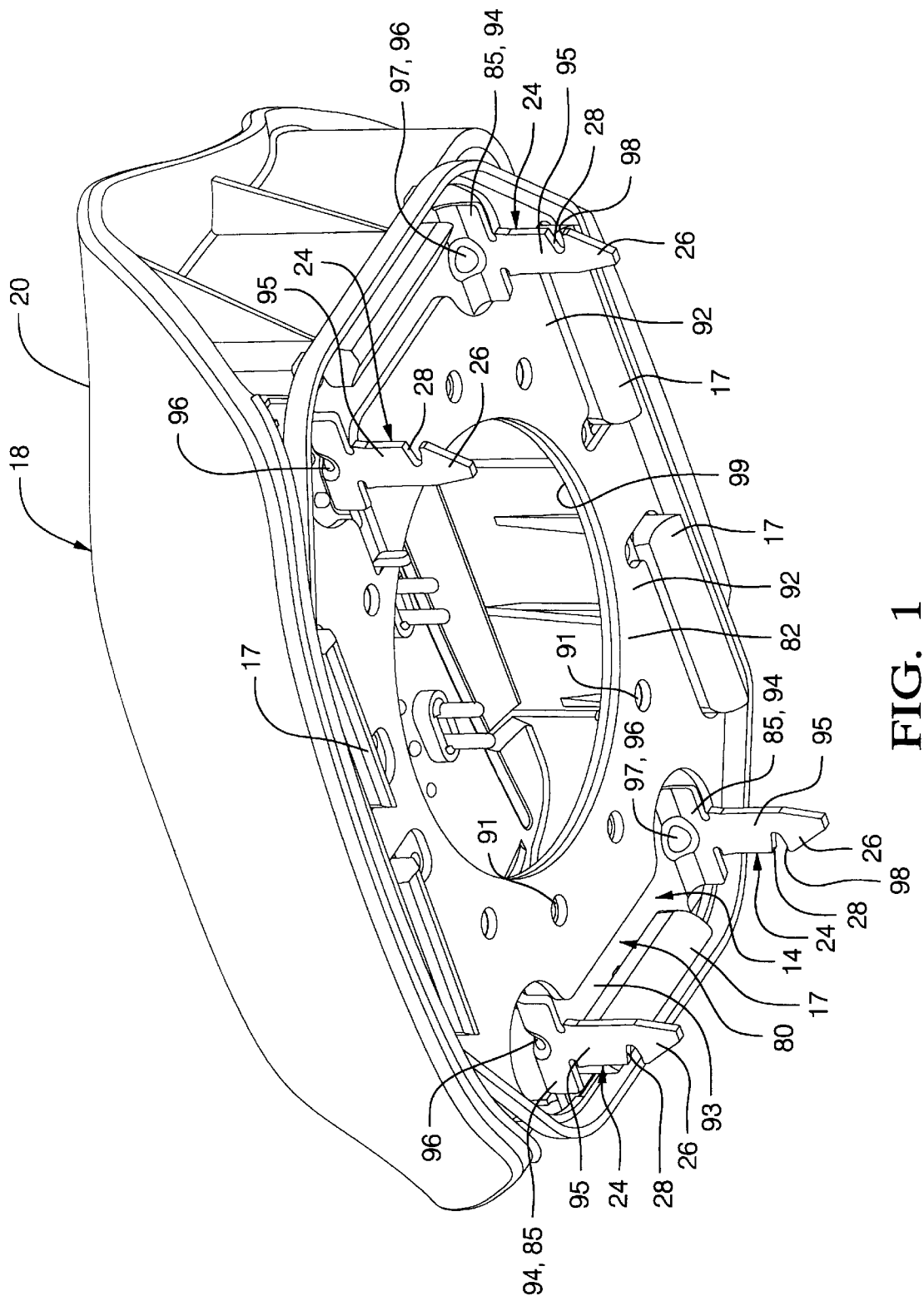
FIG. 1 is a perspective view of a mounting mechanism and cover assembly with the air bag and the inflator removed for clarity and showing the mounting members integrally formed with the base plate in accordance with this invention.

An air bag module 12 generally includes a mounting mechanism 80 including a base plate 14 for mounting an air bag 16 and an inflator (not shown). The air bag 16 is made of a conventional air bag fabric material for inflating upon receiving gas from the inflator when certain predetermined vehicle conditions are sensed. The air bag 16 is normally folded and encapsulated in a plastic cover 18 which preferably has an outer soft pad 20. The cover 18 may be secured to the base plate 14 in any suitable manner, such as by cover tabs 17 snapped over indented portions 92 in the base plate 14, as best shown in FIG. 1, and locked in place by a lower capture plate 82. The cover 18 preferably includes tear lines or weakened portions that permit the cover 18 to open during air bag inflation. The cover 18 may also be used to mount a membrane horn switch (not shown) for activating a horn. The mounting mechanism 80 advantageously includes integrally formed mounting members 24 for attaching the module 12 to the vehicle 9. Together, the assembled air bag 16, inflator, cover 18, and mounting mechanism 80 form the air bag module 12.

Figures 9, 10:
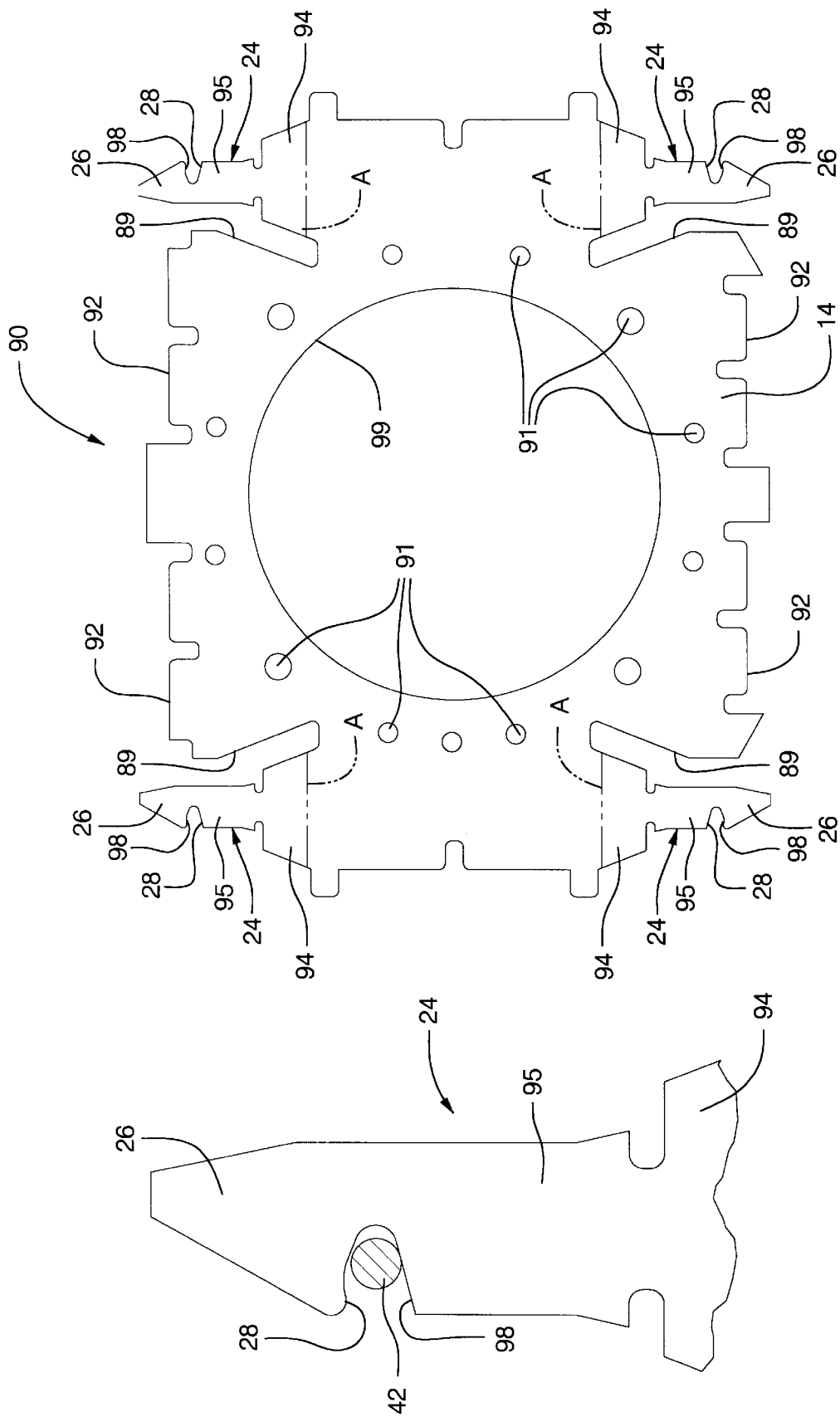
FIG. 9 is an enlarged view of the mounting member and latching element of FIG. 2.
FIG. 10 is a plan view of the blank stamped to make the mounting mechanism including the base plate and integral mounting members.

Advantageously, the mounting mechanism 80 is a single piece of planar material used to form the base plate 14 and the elongated, integrally formed mounting members 24 for easy snap-fitted attachment of the module 12 to the support plate 10 of the vehicle 9. As best shown in FIG. 10, the mounting mechanism 80, including the base plate 14 and the mounting members 24, is integrally formed in a single stamping operation on a single blank 90. Advantageously, the blank 90 is preferably a single planar piece of metal, such as steel, having a constant cross-section which can easily be shaped in a single stamping process to form the blank 90. Advantageously, the mounting members 24 are integrally formed with the base plate 14, thus eliminating the need to make separate mounting members 24 and also eliminating the need to attach the mounting members 24 to the base plate 14. The blank 90 includes four mounting members 24 as shown, each adjacent to a diagonal cut-out portion 89 which permits the mounting members 24 to be bent generally about the fold lines A.

The blank 90 further includes a stamped central inflator opening 99 through which the inflator may extend to deliver gas directly into the air bag 16. The blank 90 also preferably includes a plurality of suitable apertures 91 for receiving fasteners (not shown) to attach the air bag 16 and inflator to the base plate 14. The blank 90 is also preferably formed with indented portions 92 around which the cover tabs 17 can be snapped and then retained by the capture plate 82.

Figure 3:
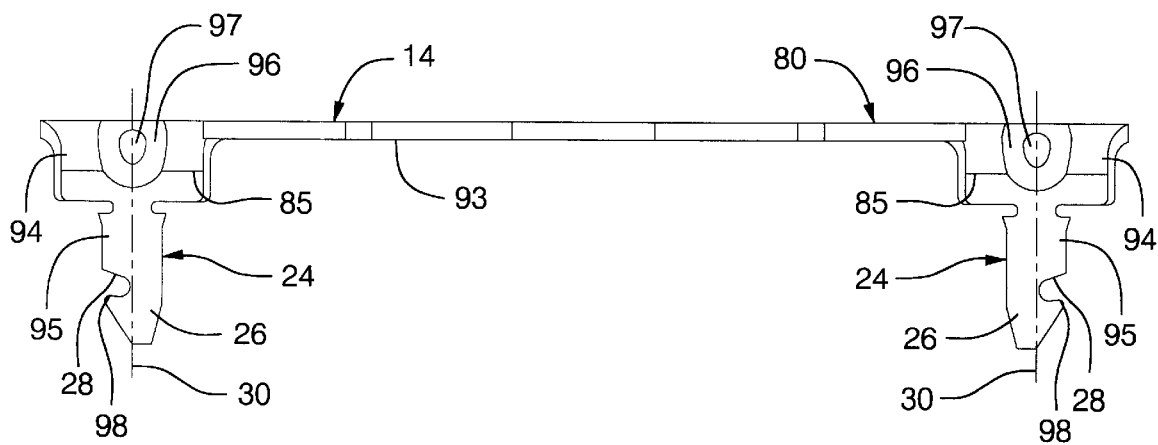
FIG. 3 is a side view of the mounting mechanism.

To complete the formation of the mounting mechanism 80 including the base plate 14 and the mounting members 24, the blank 90 is folded generally along the fold lines A about 90 degrees such that the mounting members 24 extend downwardly from a bottom surface 93 of the base plate 14 to a generally vertical position best shown in FIGS. 1 and 3. As best shown in FIG. 8, the flat mounting members 24 each include a head portion 94 having a generous, smooth radius of curvature 85 to prevent stresses on the connection between the base plate 14 and mounting members 24. Thus, the mounting members 24 are bent about the fold line A at about 90 degrees with a smooth radius of curvature 85, rather than at a sharp angle. In addition, the head portions 94 of the mounting members 24 are wider than a main body portion 95 of the mounting members 24 also for reducing stresses and strengthening of the head portions 94.

Referring to FIGS. 4, 5, and 6, the head portions 94 of the mounting members 24 each have a notched portion 96 at their center, as best shown in perspective in FIG. 1 and in plan view in FIG. 5. The notched portion 96 gives the center of the mounting members 24 an angled cross-section as shown in FIG. 5, as opposed to the curved radius cross-section shown in FIG. 8. In addition, the notched portion 96 forms a small lateral rib 97 as shown in FIG. 6 protruding from the bottom surface 93 of the base plate 14. The rib 97 of the notched portion 94 strengthens and stiffens the head portion 94 of the mounting member 24 such that the mounting member 24 is stiff enough to withstand the forces of air bag inflation without reinforcement.

As best shown in FIG. 2, the finished mounting mechanism 80 includes the base plate 14 and integral mounting members 24 which extend downwardly from the base plate 14 towards the support plate 10. In the preferred embodiment, four such mounting members 24 are provided. Each of the mounting members 24 has a generally flat and planar main body portion 95 and a widened head portion 96 which is also a flat material, but bent to have a radius of curvature 85. The body portion 95 includes a tapered distal end 26 and a slot 28 which was integrally formed during the stamping of the blank 90. As best shown in FIG. 2, the mounting members 24 each include a longitudinal axis 30 and the slot 28 is elongated in a direction generally perpendicular to the longitudinal axis 30. As best shown in FIG. 9, the slot 28 is stamped from the blank 90 to include a curved underhook 98 which projects slightly into the slot 28 to help assure retention of the round spring elements 42, as described further hereinafter.

The support plate 10 is formed with a plurality of apertures 32 corresponding in number and location to the number and location of the mounting members 24 on the mounting mechanism 80. The apertures 32 are disposed to receive the distal ends 26 of the mounting members 24 therethrough. Spring housings 34 are mounted to the rear face 38 of the support plate 10. The spring housings 34 each include a pair of slotted detent shoulders 40 for extending through the apertures 32 to hold the spring housings 34 in position on the support plate 10. Further the spring housings 34 are preferably formed of an insulating material, such as a plastic.

As best shown in FIG. 1, each of the spring housings 34 is adapted to hold at least one resilient spring element 42 thereon. The spring elements 42 traverse across one or more respective apertures 32 to ensure that the spring elements 42 contact the mounting members 24 as the air bag module 12 is moved into association with the support plate 10. Further, the spring elements 42 are preferably formed of a resilient material, such as music wire, whereby the spring elements 42 are resiliently yieldable in a lateral direction, transverse to the longitudinal axis 30, to permit insertion of the distal ends 26 of mounting members 24 through the apertures 32 and past the spring elements 42, which movement is facilitated by the tapered configuration of the distal ends 26.

After assembly of the module 12, the module 12 is easily snap-fittedly attached to the vehicle 9 at the support plate 10 as follows. The mounting members 24 are moved in a first direction towards a front face 37 of the support plate 10 and through the apertures 32 such that the spring elements 42 move laterally outward until the slots 28 on the distal ends 26 of the mounting members 24 are aligned with the spring elements 42. Then, the spring elements 42 move laterally inward and into contact with the slots 28 such that the spring elements 42 are seated as the slots 28 as best shown in FIGS. 2 and 9. As best shown in the enlarged view of FIG. 9, the underhooks 98 in the slots 28 hug the spring elements 42 and retain the spring elements 42 securely within the slots 28. In this assembled condition, the spring elements 42 prevent the mounting members 24 from moving in a second direction out of the apertures 32 whereby the module 12 is held in operative relationship to the support plate 10. It should also be appreciated that the slots 28 have longitudinal heights approximately equal to the dimension of the spring elements 42 to reduce longitudinal movement of the module 12 relative to the support plate 10. In addition, coil springs 44 may be provided surrounding each of the flat mounting members 24 for biasing the module 12 outwardly away from the support plate 10 under normal conditions and for biasing the module 12 to a release position during disassembly, as described further hereinafter.

If it is desired to separate the module 12 from the support plate 10, a screwdriver may be inserted through access apertures provided in a rear portion of the steering wheel (not shown), wherein the blade of the screwdriver is received within spaces provided in the spring housings 34 and then rotated until the blade contacts the spring elements 42. The spring elements 42 can then be biased laterally outward and out of engagement with the slot 28, including the underhook 98. The coil springs 44 bias the module 12 away from the support plate 10 upon release of the spring elements 42. In this manner, the mounting members 24 are easily released and can be moved away from and out of engagement with the support plate 10 for removal of the entire module 12 from the vehicle 9.

Advantageously, the present invention provides a mounting mechanism 80 for retaining an air bag module 12 in association with a support plate 10 disposed on a vehicle 9. Although the support plate 10 is shown as part of a steering wheel, it will be appreciated that the support plate 10 could be at any vehicle 9 location. Also advantageously, the present invention provides a method of making a mounting mechanism 80 including a base plate 14 having integrally formed mounting members 24 from a single flat blank 90 for elimination of parts and ease of manufacturability.

While the present invention has been described as carried out in a specific embodiment thereof, it is not intended to be limited thereby but is intended to cover the invention broadly within the scope and spirit of the appended claims.

What is claimed is:

1. A mounting mechanism for mounting an air bag module to a support plate of a vehicle, the mounting mechanism comprising:

a single, generally flat blank of material formed to provide a generally flat base plate and a plurality of generally flat elongated mounting members, the mounting members being bent to extend downwardly from the base plate, the mounting members adapted for attachment to the support plate whereby the module is attached to the vehicle; and wherein the support plate carries spring elements and wherein the mounting members each include a slot thereon for receiving the spring elements therein, the slots each including an underhook extending into the slot for retaining the spring elements securely in the slots.

2. A mounting mechanism for mounting an air bag module to a support plate of a vehicle, the mounting mechanism comprising:

a single, generally flat blank of material formed to provide a generally flat base plate and a plurality of generally flat elongated mounting members, the mounting members being bent to extend downwardly from the base plate, the mounting members adapted for attachment to the support plate whereby the module is attached to the vehicle; and wherein the generally flat mounting members each include a head portion and a body portion, the body portions being connected to the base plate by the head portions and wherein the head portions are wider than the body portions of the mounting members.

3. A mounting mechanism for mounting an air bag module to a support plate of a vehicle, the mounting mechanism comprising:

a single, generally flat blank of material formed to provide a generally flat base plate and a plurality of generally flat elongated mounting members, the mounting members being bent to extend downwardly from the base plate, the mounting members adapted for attachment to the support plate whereby the module is attached to the vehicle; and wherein the generally flat mounting members each include a head portion and a body portion, the body portions being connected to the base plate by the head portions, and wherein the head portions each include a radius of curvature about which the mounting members are bent relative to the base plate.

4. A mounting mechanism for mounting an air bag module to a support plate of a vehicle, the mounting mechanism comprising:

a single, generally flat blank of material formed to provide a generally flat base plate and a plurality of generally flat elongated mounting members, the mounting members being bent to extend downwardly from the base plate, the mounting members adapted for attachment to the support plate whereby the module is attached to the vehicle; and wherein the generally flat mounting members each include a head portion and a body portion, the body portions being connected to the base plate by the head portions, and wherein the head portions each include a notched portion therein, the notched portions including a rib extending laterally across each of the head portions for stiffening the mounting members.

5. A mounting mechanism for mounting an air bag module to a support plate of a vehicle, the support plate including spring elements mounted thereon, the mounting mechanism comprising:

a single, generally flat piece of material including a flat base plate with integrally formed flat mounting members connected to the base plate, the mounting members being bent to extend downwardly from the base plate, and the mounting members each including a slot thereon for receiving the spring elements therein by snap-fitted engagement when the mounting members are positioned adjacent the spring elements of the support plate wherein the mounting members are adapted for attachment to the vehicle to mount the module to the vehicle.

6. A method of making a mounting mechanism for attachment of an air bag module to a vehicle, the method comprising the steps of:

providing a single flat blank of material and stamping the blank to form the planar outline of a base plate and elongated mounting members which are integrally formed as a single flat piece with the base plate; and bending each of the mounting members at approximately 90 degrees relative to the base plate such that the mounting members extend downwardly from the base plate;

attaching an air bag and an inflator to the base plate; and stamping a slot in each of the mounting members and stamping an underhook in the mounting members extending slightly into the slots.

7. A method of making a mounting mechanism for attachment of an air bag module to a vehicle, the method comprising the steps of:

providing a single flat blank of material and stamping the blank to form the planar outline of a base plate and elongated mounting members which are integrally formed as a single flat piece with the base plate; and bending each of the mounting members at approximately 90 degrees relative to the base plate such that the mounting members extend downwardly from the base plate;

and attaching an air bag and an inflator to the base plate; and stamping the mounting members on the blank to include head portions and body portions such that the head portions attach the body portions to the base plate, and pressing a notched portion into the center of each of the head portions in a direction generally along a longitudinal axis of the mounting members, forming the notched portions to each include a laterally extending rib on each of the head portions for stiffening the mounting members.

8. A method of making a mounting mechanism for attachment of an air bag module to a vehicle, the method comprising the steps of:

providing a single flat blank of material and stamping the blank to form the planar outline of a base plate and elongated mounting members which are integrally formed as a single flat piece with the base plate; and bending each of the mounting members at approximately 90 degrees relative to the base plate such that the mounting members extend downwardly from the base plate;

attaching an air bag and an inflator to the base plate; and stamping the mounting members to include a head portion and a body portion, the head portions for connecting the body portions to the base plate, and wherein each of the body portions include a slot stamped therein, the slots each including an underhook stamped therein, the underhooks extending slightly into the respective slots.

9. A method of making a mounting mechanism for attachment of an air bag module to a vehicle, the method comprising the steps of:

providing a single flat blank of material and stamping the blank to form the planar outline of a base plate and elongated mounting members which are integrally formed as a single flat piece with the base plate; and bending each of the mounting members at approximately 90 degrees relative to the base plate such that the mounting members extend downwardly from the base plate; and attaching an air bag and an inflator to the base plate; and stamping the mounting members to include a head portion and a body portion, the head portions being wider then the body portions of the mounting members, the head portions for connecting the body portions to the base plate, the head portions being bent to each form a smooth radius of curvature at the connections of the mounting members to the base plate.

* * * * *